United States Patent Office 2,923,758
Patented Feb. 2, 1960

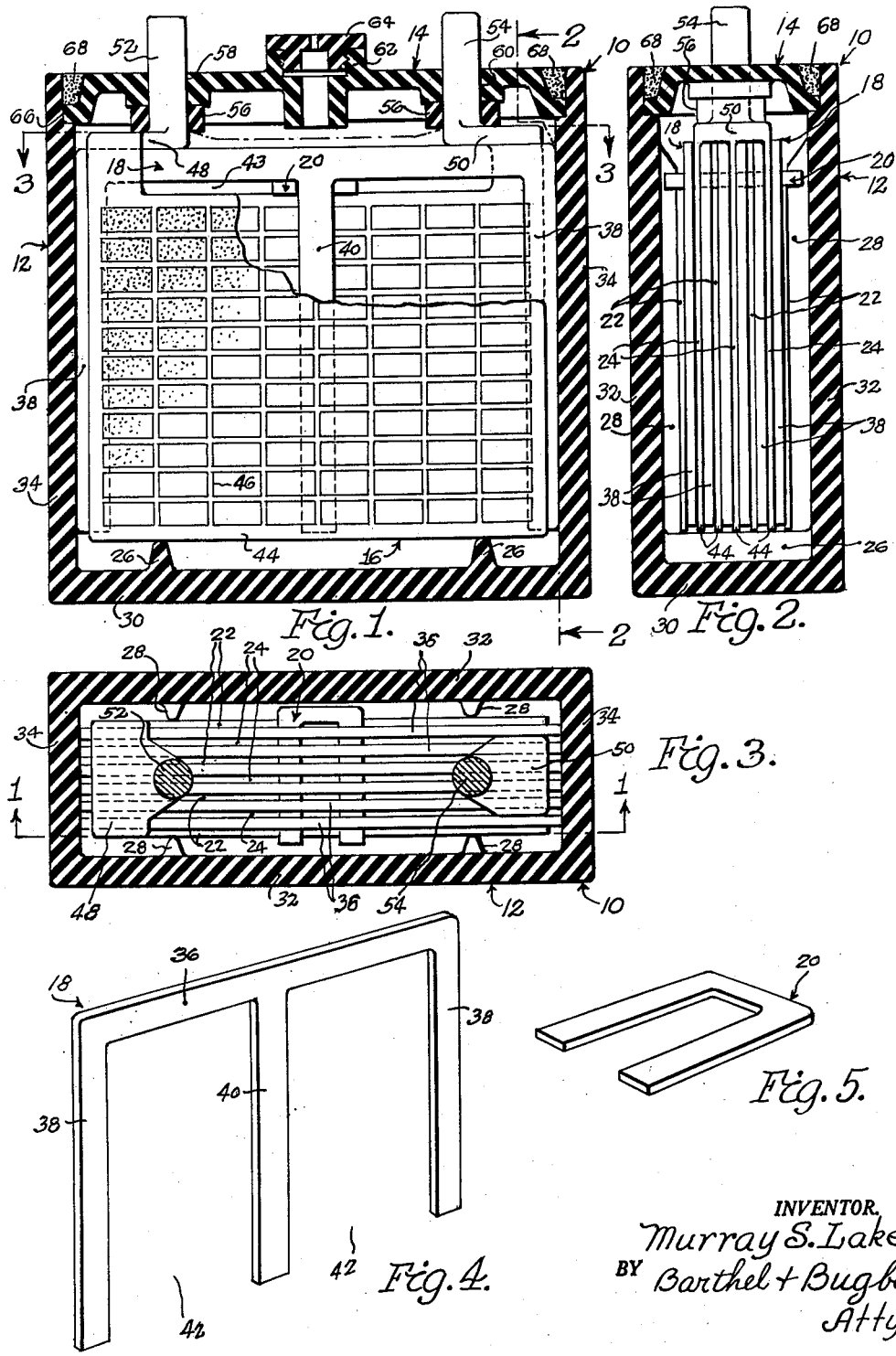

2,923,758
STORAGE BATTERY
Murray S. Lake, Holly, Mich.
Application December 23, 1957, Serial No. 704,482
3 Claims. (Cl. 136—143)

This invention relates to storage batteries.

One object of this invention is to provide a storage battery wherein multi-tined skeleton separators replace the conventional separator sheets between the battery plates, so that the separator sheets are eliminated, thereby enabling the electrolyte to reach substantially all parts of the active material in the surfaces of the plates, also providing more space and consequently a larger volume of electrolyte for a given size of battery box, giving a lower internal resistance hence a higher current output at a lower operating temperature within the cells, and enabling the battery to take a charge more quickly and more easily.

Another object is to provide a storage battery of the foregoing character wherein the elimination of the separator sheets with the consequent exposing of substantially the entire surfaces of the plates to the direct action of the electrolyte causes the electrolyte to wash down loose active material shed from the plates, thereby keeping the plates cleaner and more active and preventing short circuiting between the plates.

Another object is to provide a storage battery of the foregoing character wherein the separation of the plates with the direct exposure of substantially their entire areas to the electrolyte is accomplished by the provision of multi-tined skeleton separators, the tines of which are interconnected at their upper ends by a bridge portion the lower edge of which is spaced above the upper edges of the plates, thereby supporting the straps interconnecting the plates and thus supporting the terminal posts on the straps as well as facilitating assembly by connecting the ends of the edge spacing tines with the ends of the intermediate spacing tine or tines between them, and also enabling free circulation of the electrolyte in a substantially horizontal direction over the upper edges of the plates.

Another object is to provide a storage battery of the foregoing character wherein the upper edges of the plates are separated vertically from the bridge portions of the separators by a horizontally-extending spacer of insulating material, thereby positively holding open the horizontal flow passageways for electrolyte between the upper edges of the plates and the lower edges of the bridge portions of the plate separators and preventing the separators from sliding downward as well as aligning the separators with one another, the spacer being preferably U-shaped and horizontally-extending and engaging the aligned intermediate tines of the separators.

Other objects and advantages of the invention will become apparent during the course of the following description of the accompanying drawings, wherein:

Figure 1 is a central vertical section through a storage battery employing narrow central separator strips, according to one form of the invention, taken along the line 1—1 in Figure 3, with the upper portion of one of the plates broken away to show the separator tines and spacer;

Figure 2 is a vertical cross-section, with the plates and separators in end elevation, of the storage battery shown in Figure 1, taken along the line 2—2 in Figure 1;

Figure 3 is a horizontal section through the storage battery of Figure 1, taken along the line 3—3 in Figure 1;

Figure 4 is a perspective view of one of the three-tined skeleton plate separators used in the storage battery of Figures 1, 2 and 3; and Figure 5 is a perspective view of the aligning spacer used with the skeleton plate separators in the storage battery of Figures 1, 2 and 3.

Referring to the drawings in detail, Figures 1 to 3 inclusive show a storage battery, generally designated 10, according to one form of the invention as consisting generally of a battery box 12, a battery box cover 14, and a plate assembly 16 containing multi-tined separators 18 held in alignment with one another by a U-shaped spacer 20 which also holds the separators 18 above the upper edges of the individual positive and negative battery plates 22 and 24 respectively. The battery box 12 is formed from any suitable material which is immune to attack by the battery acid in the electrolyte and has ribs 26 and 28 projecting upwardly and inwardly from the bottom wall 30 and opposite side walls 32 of the battery box 12, the end walls 34 of which are engaged by the opposite ends of the separators 18.

The separators 18 are formed from any suitable thin insulating material, such as synthetic plastic, polystyrene plastic having been found satisfactory for this purpose. Each separator 18 consists of a connecting or bridge portion 36 from which narrow end and intermediate separator strip portions or tines 38 and 40 respectively extend downwardly from the ends and intermediate part of the connecting portion 36 (Figure 4) with broad openings 42 therebetween the widths of which are seen to be a plurality of times the widths of the tines. This skeleton construction leaves substantially the entire area of the plates 22 and 24 directly exposed to the electrolyte, so that the usual separator sheets are eliminated. The separators 18 are held in alignment with one another, with spaces 43 providing passageways which enable free interflow of electrolyte above the upper edges of the battery plates 22 and 24, the spaces 43 being kept open by the U-shaped horizontal spacer 20 engaging the lower edges of the bridge portions 36 and the upper edges of the battery plates 22 and 24 at opposite edges of the intermediate tines 40.

For the usual size of plates in ordinary mobile storage batteries, such as are used for automobiles, boats and aircraft, the three-tined separator 18 is satisfactory in preventing excessive buckling of the plates. For storage batteries with unusually large plates, however, a four-tined skeleton separator (not shown) is preferably employed.

The battery plates 22 and 24 themselves are of conventional construction, namely of lead or other suitable conducting material which is immune to attack by the acid in the battery electrolyte. The grids 44 of the plates 22 and 24 have openings 46 therein, the openings of the positive plates 22 containing a lead peroxide paste and the openings of the negative plates 24 a lead oxide paste, where the electrolyte consists of sulphuric acid.

At their upper ends, the positive plates 22 and negative plates 24 are electrically interconnected by bridge conductors or straps 48 and 50 respectively, these in turn carrying the upstanding positive and negative terminal posts 52 and 54 respectively. The terminals 52 and 54 extend upward through spacer rings 56 and through holes 58 and 60 in the battery box cover 14, which also contains a central internally-threaded tubular filling boss 62 equipped with the usual apertured threaded plug 64.

Since the positive and negative plates 22 and 24 are arranged in alternate sequence, the bridge conductors 48 and 50 obviously interconnect the upper edges of alternate plates, as is clearly shown in Figure 2. The cover 14 seated in the rabbeted portion 66 of the upper edge of the battery box 12 is sealed in position by a conventional sealing compound 68.

In the operation of the storage battery 10 shown in Figures 1 to 3 inclusive, the parts are assembled in the manner shown therein with the plates 22 and 24 separated from one another by the multi-tined separators 18. The lower edges of the bridge portions 36 of the latter are spaced vertically above the upper edges of the plates 22 and 24 and also held in alignment with one another by the U-shaped horizontal spacer 20.

When the electrolyte is inserted, either before or after the battery has been previously charged, the terminals 52 and 54 are connected to the circuit which the battery 10 is to supply with direct current electricity. This the battery 10 does in a greatly improved manner because of the direct accessibility of the electrolyte to substantially the entire area of the plates 22 and 24, thereby directly contacting the paste in the openings 46 of the grids 44 thereof. This action is in decided contrast to that of the conventional storage battery which has separated sheets extending over substantially the entire areas of the grids 44, preventing direct access of the electrolyte to the paste and enabling the electrolyte to reach the plates only through the narrow interstices between the plates and the separator sheets.

As a result of the construction of the battery of the present invention, the battery takes a charge more quickly and easily, operates at a lower temperature because of its lower internal resistance than a conventional battery, and gives a much higher current output without overheating. Moreover, due to the almost entire absence of separators except for the very narrow separator tines 38 and 40, the free space within a given size of battery box is much greater for the present battery than for conventional batteries, since the volume occupied by the separator sheets has been substantially eliminated, thereby increasing the volume of electrolyte for a given size of battery box.

Moreover, where the battery of the present invention is used in mobile installations such as automobiles, boats and aircraft, the motion of the electrolyte in the battery box during travel causes the electrolyte to wash down any particles or pieces of loose active material being shed from the plates, thereby preventing short-circuiting of the plates by such pieces of material and keeping the plates in a cleaner and more active condition than hitherto.

The openings 42 between the tines 38 and 40 of the separators 18 give direct access of the electrolyte to substantially all parts of the battery plate grids 44, which are almost completely exposed. The spaces 43 provided by the spacer 20 provide horizontal passage ways enabling free horizontal interflow of the electrolyte between the lower edges of the bridge portion 36 of the separator 18 and the upper edges of the plates 22 and 24. Moreover, the fact that the separator strips 38 and 40 are in the form of tines attached to the upper bridge portion 36 renders them incapable of accidental and undesired displacement and makes their insertion and removal easier. The storage battery 10, because of the skeleton construction of the separators 18, also operates at a lower temperature with a higher current output than conventional batteries, not only because of the greater volume of the electrolyte provided for a given size of battery box but also because the electrolyte is not hindered in reaching the plates by the separator sheets used in prior conventional batteries.

The operation of the battery 10 equipped with four-tined separators (not shown) is similar to that described in connection with Figure 4, and a similar action occurs. The additional tine or tines gives additional protection against excessive buckling of plates of larger than ordinary size.

What I claim is:

1. A storage battery comprising a receptacle adapted to contain an electrolyte, a multiplicity of storage battery plates disposed vertically in said receptacle in transversely-spaced interleaved parallel relationship, said storage battery plates having electro-chemically-reactive current storage materials thereon imparting positive and negative polarities thereto, positive and negative bridging conductors interconnecting the positive plates and the negative plates respectively, positive and negative electrical connection terminals connected respectively to said positive and negative bridging conductors, and skeleton separators disposed between said plates and leaving substantially the entire immersed areas of said plates directly exposed to the electrolyte, each of said skeleton separators having a substantially horizontal bridge portion disposed above said plates with its lower edge disposed above the upper edges of the plates adjacent thereto in vertically-spaced relationship therewith providing horizontal passageways for free horizontal interflow of electrolyte above the upper edges of said plates and a plurality of horizontally-spaced substantially vertical relatively narrow elongated tines extending downwardly from said bridge portion into the spaces between said plates.

2. A storage battery, according to claim 1, wherein a spacing member is disposed horizontally between the lower edges of the bridge portions and the upper edges of the plates.

3. A storage battery, according to claim 2, wherein the spacing member is an approximately U-shaped member with elongated arms disposed horizontally between the lower edges of the bridge portions and the upper edges of the plates and extending adjacent the opposite edges of the intermediate tines of said separators in aligning relationship therewith.

References Cited in the file of this patent

UNITED STATES PATENTS

| | | |
|---|---|---|
| 31,315 | Porter | Aug. 1, 1899 |
| 1,500,287 | Wales | July 8, 1924 |
| 1,515,738 | Hiatt et al. | Nov. 18, 1924 |